(12) United States Patent
Ohashi et al.

(10) Patent No.: US 11,334,297 B2
(45) Date of Patent: May 17, 2022

(54) CONTROL DEVICE, CONTROL METHOD OF CONTROL DEVICE, AND STORAGE MEDIUM FOR CONTROLLING DATA AGGREGATION

(71) Applicant: SEIKO EPSON CORPORATION, Tokyo (JP)

(72) Inventors: Kazuki Ohashi, Shiojiri (JP); Yuki Adachi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/924,603

(22) Filed: Jul. 9, 2020

(65) Prior Publication Data

US 2021/0011672 A1 Jan. 14, 2021

(30) Foreign Application Priority Data

Jul. 10, 2019 (JP) .............................. JP2019-128234

(51) Int. Cl.
*G06F 3/12* (2006.01)
(52) U.S. Cl.
CPC ............ *G06F 3/1208* (2013.01); *G06F 3/126* (2013.01); *G06F 3/1241* (2013.01)
(58) Field of Classification Search
CPC ...... G06F 3/1208; G06F 3/1241; G06F 3/126; G06F 3/1262; G06F 3/1211
See application file for complete search history.

(56) References Cited

U.S. PATENT DOCUMENTS

| 2001/0031150 | A1 | 10/2001 | Shimada et al. | |
| 2009/0033978 | A1* | 2/2009 | Morales | G06F 3/1214 358/1.15 |
| 2014/0049795 | A1* | 2/2014 | Arpino | G06Q 10/06 358/1.15 |

FOREIGN PATENT DOCUMENTS

JP 2001-345973 12/2001

* cited by examiner

*Primary Examiner* — Iriana Cruz
(74) *Attorney, Agent, or Firm* — Workman Nydegger

(57) ABSTRACT

A terminal device includes: a printer driver execution unit that generates divided job execution data that causes a printer to perform printing; a terminal storage unit that stores divided job execution data generated by the printer driver execution unit; a determination unit that determines whether or not a predetermined aggregation condition is met; an aggregation unit that, when the determination unit determines that the predetermined aggregation condition is met, generates aggregated divided job execution data in which a plurality of divided job execution data stored in the terminal storage unit are aggregated; and a terminal communication unit that transmits the aggregated divided job execution data generated by the aggregation unit to the printer.

7 Claims, 4 Drawing Sheets

CONTROL DEVICE, CONTROL METHOD OF CONTROL DEVICE, AND STORAGE MEDIUM FOR CONTROLLING DATA AGGREGATION

The present application is based on, and claims priority from JP Application Serial Number 2019-128234, filed Jul. 10, 2019, the disclosure of which is hereby incorporated by reference herein in its entirety.

BACKGROUND

1. Technical Field

The present disclosure relates to a control device, a control method of the control device, and a storage medium.

2. Related Art

Technologies of aggregating a plurality of data are known. For example, JP-A-2001-345973 discloses a technology for transmitting, to a printer device, data in which a plurality of documents selected by an operator's operation are aggregated in the order of the selection.

In JP-A-2001-345973, however, while one print material is not mixed with another print material corresponding to a document selected by an operator, the operator's effort is required in data aggregation.

SUMMARY

According to an aspect of the present disclosure, provided is a control device including: a generation unit that generates at least one execution data piece causing a printer device to perform printing; a storage unit that stores the at least one execution data piece generated by the generation unit; a determination unit that determines whether or not a predetermined aggregation condition is met; an aggregation unit that, when the determination unit determines that the predetermined aggregation condition is met, generates aggregated execution data in which a plurality of execution data pieces stored in the storage unit are aggregated; and a transmission unit that transmits the aggregated execution data generated by the aggregation unit to the printer device.

In the control device described above, the generation unit may generate, in accordance with divided job data related to corresponding one of divided jobs, execution data that causes the printer device to execute the divided job.

In the control device described above, when, after the storage unit stores an execution data piece, the storage unit does not store another execution data piece for a certain period, the determination unit may determine that the predetermined aggregation condition is met.

In the control device described above, the determination unit may acquire processing capacity information indicating a processing capacity of the control device, determine the certain period in accordance with the processing capacity indicated by the acquired processing capacity information, and determine in accordance with the determined certain period whether or not the predetermined aggregation condition is met.

In the control device described above, the divided job data may include identification information that identifies a single print job, and when identification information included in divided job data received by the generation unit differs from identification information included in divided job data that is generated, the determination unit may determine that the predetermined aggregation condition is met.

In the control device described above, a plurality of printer queues may be included, and when one of the printer queues of execution data generated by the generation unit differs from one of the printer queues of execution data stored in the storage unit, the determination unit may determine that the predetermined aggregation condition is met.

In the control device described above, the aggregation unit may determine the number of sets of print materials to be printed by a single print job in accordance with execution data to be aggregated, and generate aggregated execution data that causes the printer device to perform printing of one of the sets of print materials, and the transmission unit may transmit the generated aggregated execution data to the printer device in accordance with the determined number of sets of print materials.

According to another aspect of the present disclosure, provided is a control method of a control device, and the control method includes: generating at least one execution data piece that causes a printer device to perform printing; storing the at least one generated execution data piece; determining whether or not a predetermined aggregation condition is met; when it is determined that the predetermined aggregation condition is met, generating aggregated execution data in which a plurality of stored execution data pieces are aggregated; and transmitting the generated aggregated execution data to the printer device.

According to yet another aspect of the present disclosure, provided is a non-transitory computer-readable storage medium storing a program executed by a control unit of a control device including a generation unit that generates at least one execution data piece causing a printer device to perform printing, a storage unit that stores the at least one execution data piece generated by the generation unit, a communication unit that communicates with the printer device, and the program causes the control unit to execute a process including: determining whether or not a predetermined aggregation condition is met; when it is determined that the predetermined aggregation condition is met, generating aggregated execution data in which a plurality of execution data pieces stored in the storage unit are aggregated; and causing the communication unit to transmit the generated aggregated execution data to the printer device.

DESCRIPTION OF EXEMPLARY EMBODIMENTS

Figure 1:
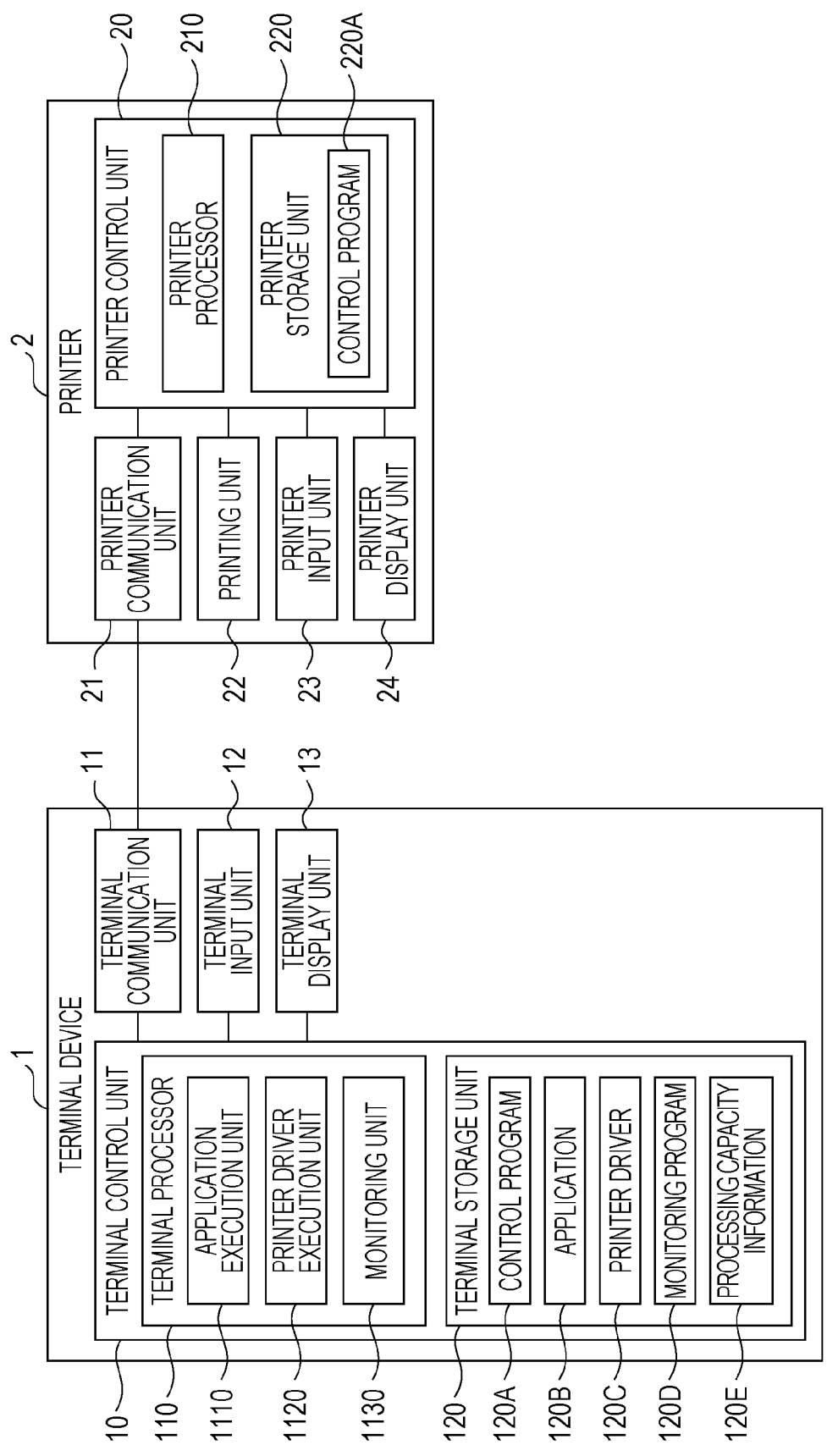
FIG. 1 is a block diagram illustrating a configuration of respective devices included in a printer system.

FIG. 1 is a block diagram illustrating the configuration of respective devices included in a printer system 100. As illustrated in FIG. 1, the printer system 100 includes a terminal device 1 and a printer 2. In the printer system 100, the printer 2 prints a print material when printing in accordance with a print data ID transmitted by the terminal device 1. The terminal device 1 corresponds to an example of a control device. The printer 2 corresponds to an example of a printer device.

The terminal device 1 is a personal computer (PC). The terminal device 1 may be of a laptop type, a tablet type, or a desktop type.

The terminal device 1 includes a terminal control unit 10, a terminal communication unit 11, a terminal input unit 12, and a terminal display unit 13. The terminal communication unit 11 corresponds to an example of a transmission unit and a communication unit.

The terminal control unit 10 has a terminal processor 110 such as a CPU or an MPU, which is a processor that executes a program, and a terminal storage unit 120 and controls each component of the terminal device 1. The terminal storage unit 120 corresponds to an example of a storage unit. The terminal control unit 10 performs various processes in cooperation with hardware and software so that the terminal processor 110 reads a control program 120A stored in the terminal storage unit 120 and performs the process.

Further, the terminal control unit 10 functions as an application execution unit 1110 when the terminal processor 110 reads and executes an application 120B stored in the terminal storage unit 120. Further, the terminal control unit 10 functions as a printer driver execution unit 1120 when the terminal processor 110 reads and executes a printer driver 120C stored in the terminal storage unit 120. The printer driver execution unit 1120 corresponds to an example of a generation unit. Further, the terminal control unit 10 functions as a monitoring unit 1130 when the terminal processor 110 reads and executes a monitoring program 120D stored in the terminal storage unit 120. The monitoring program 120D corresponds to an example of a program. Note that the monitoring program 120D may be configured as a program separate from the control program 120A or may be configured as a program forming a part of the control program 120A. Details of the application execution unit 1110, the printer driver execution unit 1120, and the monitoring unit 1130 will be described later.

The terminal storage unit 120 has a storage region that stores a program executed by the terminal processor 110 or data processed by the terminal processor 110. The terminal storage unit 120 stores the control program 120A, the application 120B, the printer driver 120C, and the monitoring program 120D executed by the terminal processor 110, processing capacity information 120E, and various other data. The terminal storage unit 120 has a nonvolatile storage region that stores a program or data in a nonvolatile manner. Further, the terminal storage unit 120 may have a volatile storage region and form a work area that temporarily stores a program executed by the terminal processor 110 or data being processed.

The processing capacity information 120E is information indicating the processing capacity of the terminal device 1 and includes information indicating the processing capacity of the terminal processor 110. The processing capacity information 120E may be information indicating the maximum processing capacity of the terminal processor 110 or may be information indicating the current processing capacity obtained by taking the usage of the storage region of the terminal device 1 into consideration.

The terminal communication unit 11 has communication hardware compliant with a predetermined communication standard and communicates with the printer 2 in accordance with the predetermined communication standard under the control of the terminal control unit 10. Note that the communication hardware may be a hardware component such as a communication circuit, a communication port, a communication substrate, a communication connector, or the like, for example. The communication standard used between the terminal communication unit 11 and the printer 2 may be a standard related to wired communication or a standard related to wireless communication.

The terminal input unit 12 has an input unit such as an operating switch, a touch panel, a mouse, a keyboard, or the like that is provided to the terminal device 1 and detects a user operation performed on the input unit and outputs a detection result to the terminal control unit 10. In accordance with input from the terminal input unit 12, the terminal control unit 10 performs a process corresponding to an operation performed on the input unit.

The terminal display unit 13 has an LED, a display panel, or the like and causes the LED to be switched on, to blink, or to be switched off in a predetermined manner, causes the display panel to display information, or the like under the control of the terminal control unit 10.

The printer 2 is a serial ink jet printer that discharges ink from serial type print heads to form dots on a printing medium and prints a character, an image, or the like.

The printer 2 has a printer control unit 20, a printer communication unit 21, a printing unit 22, a printer input unit 23, and a printer display unit 24.

The printer control unit 20 has a printer processor 210 such as a CPU or an MPU, which is a processor that executes a program, and a printer storage unit 220 and controls each component of the printer 2. The printer control unit 20 performs various processes in cooperation with hardware and software so that the printer processor 210 reads a control program 220A stored in the printer storage unit 220 and performs the process.

The printer storage unit 220 has a storage region that stores a program executed by the printer processor 210 or data processed by the printer processor 210. The printer storage unit 220 stores the control program 220A executed by the printer processor 210 and other various data.

The printer storage unit 220 has a nonvolatile storage region that stores a program or data in a nonvolatile manner. Further, the printer storage unit 220 may have a volatile storage region and form a work area that temporarily stores a program executed by the printer processor 210 or data being processed.

The printer communication unit 21 has communication hardware compliant with a predetermined communication standard and communicates with the terminal device 1 in accordance with the predetermined communication standard under the control of the printer control unit 20. Note that the communication hardware may be a hardware component such as a communication circuit, a communication port, a communication substrate, or a communication connector, for example.

The printing unit 22 has a component related to printing, such as an ink jet head that discharges ink and forms dots on a printing medium, a carriage that causes the ink jet head to operate in a scan direction, a carriage drive motor that drives the carriage, a transport unit that transports the printing medium, or an ink supply unit that supplies ink to the ink jet head. The printing unit 22 performs printing in accordance with a print data ID received from the terminal device 1 and outputs a printed material under the control of the printer control unit 20.

The printer input unit 23 has an input unit such as an operating switch or a touch panel that is provided to the printer 2 and detects a user operation performed on the input unit and outputs the detected user operation to the printer control unit 20. In accordance with input from the printer input unit 23, the printer control unit 20 performs a process corresponding to an operation performed on the input unit.

The printer display unit 24 has an LED, a display panel, or the like and causes the LED to be switched on, blink, or switched off in a predetermined manner, causes the display panel to display information, or the like under the control of the printer control unit 20.

Figure 2:
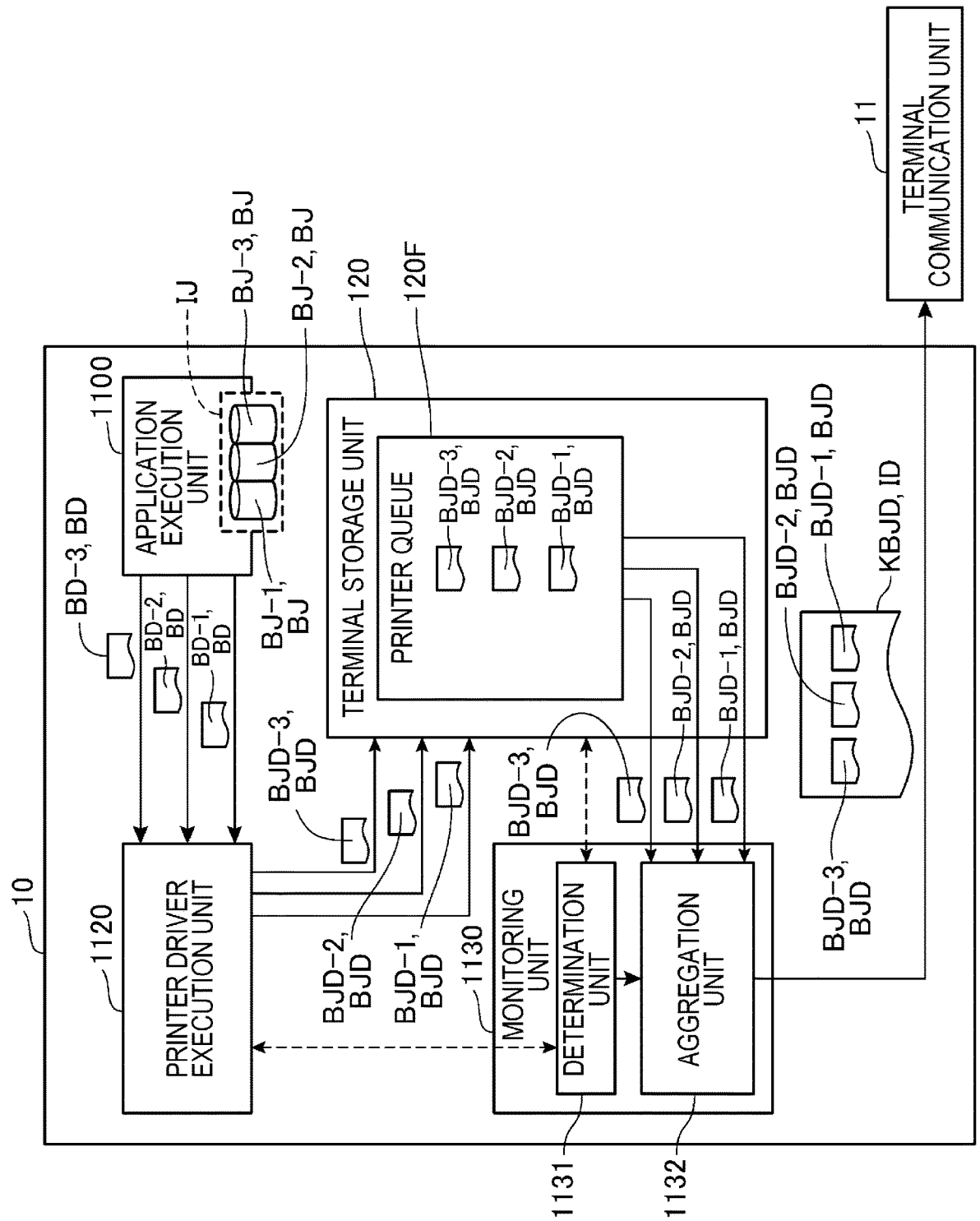
FIG. 2 is a diagram illustrating function blocks of a terminal control unit.

Next, function blocks of the terminal control unit 10 of the terminal device 1 will be described. FIG. 2 is a diagram illustrating function blocks of the terminal control unit 10 of the terminal device 1. In FIG. 2, the terminal storage unit 120 is represented for the convenience of illustration.

The application execution unit 1110 causes a user interface used for accepting a print execution instruction from the user to be displayed on the terminal display unit 13 in accordance with the function of the application 120B. The application execution unit 1110 generates a plurality of divided job data BD in response to accepting a print execution instruction via the user interface.

The divided job data BD is data related to a divided job BJ that is one of multiple jobs divided from a single print job IJ. The single print job IJ in the present embodiment refers to a series of operations performed by the printer 2 for printing one or a plurality of print materials in accordance with a single print execution instruction obtained from a user. For example, when a user intends to print two sets of print materials each consisting of 10 pages via a single print execution instruction, the single print job IJ refers to a series of operations for printing two sets of the print materials each consisting of 10 pages. Further, the divided job BJ corresponds to each of the jobs obtained when a single print job IJ is divided by the application 120B in accordance with a predetermined criterion. Single divided job data BD includes at least image data GD representing an image to be printed by execution of a single divided job BJ and identification information that identifies a single print job IJ. The identification information on a single print job IJ is generated by the function of the application 120B and included in the divided job data BD.

In response to accepting a print execution instruction via the user interface, the application execution unit 1110 generates the divided job data BD in the order of execution in a single print job IJ for each of the divided jobs BJ to divide the single print job IJ into multiple print jobs. The application execution unit 1110 transmits the generated divided job data BD to the printer driver execution unit 1120 in the order of generation.

For example, as illustrated in FIG. 2, it is assumed that the application execution unit 1110 divides a single print job IJ into three divided jobs BJ, namely, divided jobs BJ-1, BJ-2, and BJ-3. Note that, in FIG. 2, printing is performed in the order of the divided jobs BJ-1, BJ-2, and BJ-3 when the single print job IJ is executed. In such a case, the application execution unit 1110 generates divided job data BD-1 associated with the divided job BJ-1, divided job data BD-2 associated with the divided job BJ-2, and divided job data BD-3 associated with the divided job BJ-3 in this order, as illustrated in FIG. 2. The application execution unit 1110 then transmits the divided job data BD to the printer driver execution unit 1120 in the order of the divided job data BD-1, BD-2, and BD-3.

The printer driver execution unit 1120 generates divided job execution data BJD that causes the printer 2 to execute the divided jobs BJ for each of the plurality of divided job data BD received from the application execution unit 1110 in the order of reception. The divided job execution data BJD corresponds to an example of execution data. The divided job execution data BJD includes at least image data GD included in the divided job data BD, a print command used for printing an image represented by the image data GD, and identification information on a single print job IJ included in the divided job data BD. The printer driver execution unit 1120 stores the generated divided job execution data BJD in a printer queue 120F of the terminal storage unit 120 in the order of generation. Note that a print command included in the divided job execution data BJD is a command that supports the command system of the printer 2.

The printer queue 120F is formed in a predetermined storage region of the terminal storage unit 120 and temporarily stores the divided job execution data BJD generated by the printer driver execution unit 1120.

For example, as illustrated in FIG. 2, it is assumed that the printer driver execution unit 1120 receives the divided job data BD from the application execution unit 1110 in the order of the divided job data BD-1, BD-2, and BD-3. In such a case, as illustrated in FIG. 2, the printer driver execution unit 1120 generates divided job execution data BJD-1, which causes the printer 2 to execute the divided job BJ-1 in accordance with the divided job data BD-1, and stores the generated divided job execution data BJD-1 in the printer queue 120F. Next, the printer driver execution unit 1120 generates divided job execution data BJD-2, which causes the printer 2 to execute the divided job BJ-2 in accordance with the divided job data BD-2, and stores the generated divided job execution data BJD-2 in the printer queue 120F. Next, the printer driver execution unit 1120 generates divided job execution data BJD-3, which causes the printer 2 to execute the divided job BJ-3 in accordance with the divided job data BD-3, and stores the generated divided job execution data BJD-3 in the printer queue 120F. Accordingly, three divided job execution data BJD are stored in the printer queue 120F in the order of generation in the printer driver execution unit 1120.

The monitoring unit 1130 is a function unit that monitors the printer driver execution unit 1120. The monitoring unit 1130 has a determination unit 1131 and an aggregation unit 1132.

First, the aggregation unit 1132 will be described. When the determination unit 1131 determines that an aggregation condition described later is met, the aggregation unit 1132 reads all of the plurality of divided job execution data BJD stored in the printer queue 120F of the terminal storage unit 120 and generates aggregated divided job execution data KBJD in which the plurality of read divided job execution data BJD are aggregated. The aggregated divided job execution data KBJD corresponds to an example of aggregated execution data. The aggregation unit 1132 aggregates a plurality of divided job execution data BJD so that the printer 2 processes the divided job execution data BJD in the order of being stored in the printer queue 120F. The aggregation unit 1132 causes the terminal communication unit 11 to transmit the generated aggregated divided job execution data KBJD to the printer 2 as a print data ID.

For example, it is assumed that three divided job execution data BJD, namely, the divided job execution data BJD-1, BJD-2, and BJD-3 are stored in this order in the printer queue 120F, as illustrated in FIG. 2. In such a case, if the determination unit 1131 determines that an aggregation condition is met, the aggregation unit 1132 generates the aggregated divided job execution data KBJD in which the divided job execution data BJD-1, BJD-2, and BJD-3 are aggregated so as to be processed by the printer 2 in this order. The aggregation unit 1132 then causes the terminal communication unit 11 to transmit the generated aggregated divided job execution data KBJD to the printer 2.

The determination unit 1131 determines whether or not an aggregation condition according to which the aggregation unit 1132 performs generation of the aggregated divided job execution data KBJD is met. Details of the aggregation condition will be described later with reference to a flowchart illustrated in FIG. 3. If the determination unit 1131 determines that the aggregation condition is met, the determination unit 1131 notifies the aggregation unit 1132 that the aggregation condition is met.

Figure 3:
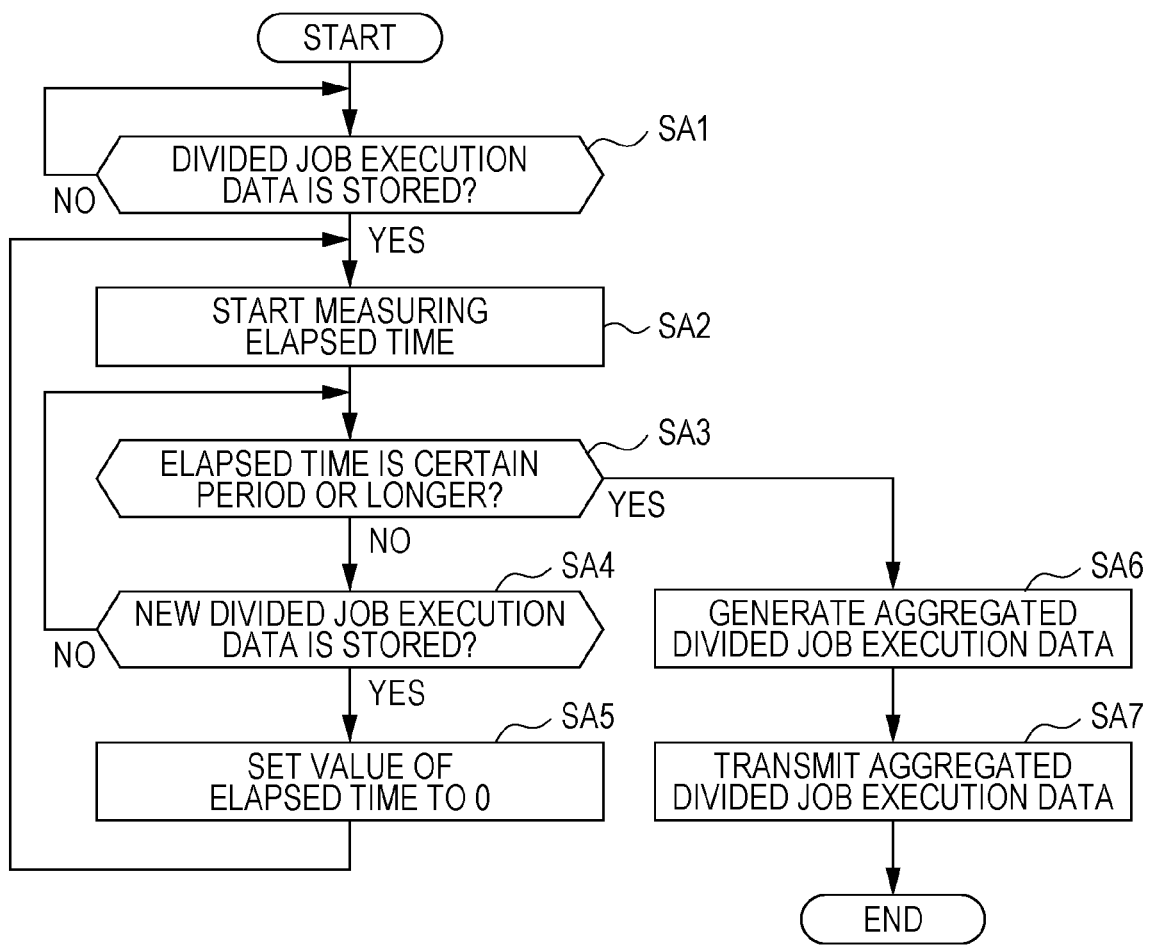
FIG. 3 is a flowchart illustrating an operation in a terminal device.

Next, the operation of the terminal device 1 will be described. FIG. 3 is a flowchart illustrating the operation of the terminal device 1. In particular, the flowchart illustrated in FIG. 3 illustrates the operation of the monitoring unit 1130.

The determination unit 1131 of the monitoring unit 1130 determines whether or not divided job execution data BJD generated by the printer driver execution unit 1120 is stored in the printer queue 120F of the terminal storage unit 120 (step SA1).

If the determination unit 1131 determines that divided job execution data BJD is stored in the printer queue 120F (step SA1: YES), the determination unit 1131 starts measuring the elapsed time from when the printer driver execution unit 1120 stored the divided job execution data BJD in printer queue 120F (step SA2).

The determination unit 1131 determines whether or not the elapsed time is greater than or equal to a certain period (step SA3). The certain period may be 10 seconds, for example.

If the determination unit 1131 determines that the elapsed time is less than a certain period (step SA3: NO), the determination unit 1131 determines whether or not new divided job execution data BJD is stored in the printer queue 120F of the terminal storage unit 120 (step SA4).

If the determination unit 1131 determines that new divided job execution data BJD is not stored in the printer queue 120F of the terminal storage unit 120 (step SA4: NO), the process returns to step SA3.

On the other hand, if the determination unit 1131 determines that new divided job execution data BJD is stored in the printer queue 120F of the terminal storage unit 120 (step SA4: YES), the determination unit 1131 resets the value of the elapsed time, the measuring of which is started in step SA2, to zero (step SA5) and performs the process of step SA2 again.

Turning back to the description of step SA3, if the determination unit 1131 determines that the elapsed time is greater than or equal to a certain period (step SA3: YES), the aggregation unit 1132 generates aggregated divided job execution data KBJD (step SA6). Note that, although illustration of related steps is omitted, the aggregation unit 1132 provides no notification to the effect that a plurality of divided job execution data BJD are aggregated in the generation of the aggregated divided job execution data KBJD.

The aggregation unit 1132 then causes the terminal communication unit 11 to transmit the generated aggregated divided job execution data KBJD to the printer 2 (step SA7).

As discussed above, since the aggregation unit 1132 generates and transmits the aggregated divided job execution data KBJD when the determination unit 1131 determines that the elapsed time is greater than or equal to a certain period, a plurality of divided job execution data BJD used for executing a single print job IJ can be automatically transmitted to the printer 2 as a single set of data. Thus, even when the printer 2 receives a print data ID from another terminal device 1, one terminal device 1 can prevent a print material based on a print data ID transmitted from the other terminal device 1 from being mixed with a print material to be printed by the printer 2 in accordance with execution of the single print job IJ. Therefore, the terminal device 1 may automatically prevent a print material that the user does not intend to print from being mixed with a print material to be printed by the printer 2.

Further, to determine whether or not the aggregation condition is met, the determination unit 1131 determines whether or not the elapsed time from the last time the printer driver execution unit 1120 stored the divided job execution data BJD in the terminal storage unit 120 is greater than or equal to a certain period. This provides the following advantageous effects. When multiple print execution instructions are provided to a single terminal device 1, it is anticipated that the user provides print execution instructions at certain intervals for respective print execution instructions. Thus, there is a likelihood that a plurality of divided job execution data BJD for execution of one single print job IJ and another plurality of divided job execution data BJD for execution of another single print job IJ that differs from the one single print job IJ are stored in the printer queue 120F with a certain interval therebetween. Accordingly, the determination unit 1131 performs determination in accordance with the elapsed time to determine whether or not the aggregation condition is met, and thereby the aggregation unit 1132 can automatically and accurately transmit the plurality of divided job execution data BJD for execution of each single print job IJ to the printer 2 as a single set of data. Therefore, the terminal device 1 may automatically and accurately prevent a print material that the user does not intend to print from being mixed with a print material to be printed by the printer 2.

Note that a certain period used by the determination unit 1131 as a criterion for determining whether or not the aggregation condition is met may be a period in accordance with a processing capacity of the terminal device 1 instead of a fixed period. In the case of such a configuration, the determination unit 1131 acquires the processing capacity information 120E from the terminal storage unit 120. The time of acquiring processing capacity information 120E may be the time when the terminal control unit 10 functions as the monitoring unit 1130 or may be the time when measuring of step SA2 is started. The determination unit 1131 determines the certain period used as a criterion for determining whether or not the aggregation condition is met in accordance with the processing capacity indicated by the processing capacity information 120E acquired from the terminal storage unit 120. The determination unit 1131 determines that the certain period is shorter for a higher processing capacity indicated by the processing capacity information 120E. Accordingly, the certain period used as a criterion for determining whether or not the aggregation condition is met is shorter when the processing capacity of the terminal device 1 is higher, and this enables the aggregation unit 1132 to promptly generate the aggregated divided job execution data KBJD, and accordingly waiting time for printing can be reduced. Further, the certain period used as a criterion for determining whether or not the aggregation condition is met is longer when the processing capacity of the terminal device 1 is lower. This enables the aggregation unit 1132 to accurately generate the aggregated divided job execution data KBJD used for performing the print job IJ and accurately prevent a print material that the user does not intend to print from being mixed with a print material to be printed by the printer 2.

In the embodiment described above, as the aggregation condition that the determination unit 1131 determines to be or not to be met, the condition in accordance with the elapsed time from the last time the printer driver execution unit 1120 stored the divided job execution data BJD in the terminal storage unit 120 is illustrated as an example. However, the aggregation condition that the determination unit 1131 determines to be or not to be met is not limited to such a condition. For example, the following aggregation conditions may be determined instead of or parallel to the aggregation condition in accordance with the elapsed time.

Another Example of Aggregation Condition

For example, the aggregation condition that the determination unit 1131 determines to be or not to be met may be that identification information on a single print job IJ included in divided job data BD received by the printer driver execution unit 1120 differs from that in another divided job data BD. When determining whether or not this aggregation condition is met, the determination unit 1131 monitors the divided job data BD received by the printer driver execution unit 1120 from the application execution unit 1110. When identification information on the single print job IJ included in the divided job data BD being monitored differs from identification information included in the divided job data BD previously received by the printer driver execution unit 1120, the determination unit 1131 determines that the aggregation condition is met. The aggregation unit 1132 then aggregates a plurality of divided job execution data BJD stored in the printer queue 120F and generates the aggregated divided job execution data KBJD when the determination unit 1131 determines that the aggregation condition is met. Determination of this aggregation condition enables the aggregation unit 1132 to automatically and accurately transmit the plurality of divided job execution data BJD for execution of a single print job IJ to the printer 2 as a single set of data. Therefore, the terminal device 1 may automatically and accurately prevent a print material that the user does not intend to print from being mixed with a print material to be printed by the printer 2.

The determination unit 1131 may be configured to perform the determination as to whether or not the aggregation condition is met in accordance with the fact that identification information on the single print job IJ has changed and parallel to the determination as to whether or not the aggregation condition is met in accordance with the elapsed time. In such a case, if the determination unit 1131 determines that any one of the aggregation conditions is met, the aggregation unit 1132 generates the aggregated divided job execution data KBJD. According to such a configuration, the aggregation unit 1132 can automatically and accurately transmit the plurality of divided job execution data BJD for execution of a single print job IJ to the printer 2 as a single set of data even when the user provides print execution instructions to a single terminal device 1 at short intervals. Therefore, the terminal device 1 may automatically and accurately prevent a print material that the user does not intend to print from being mixed with a print material to be printed by the printer 2.

Another Example of Aggregation Condition

Further, the aggregation condition that the determination unit 1131 determines to be or not to be met may be that the printer queue 120F which stores the divided job execution data BJD generated by the printer driver execution unit 1120 has changed, for example. In the case of such an aggregation condition, a plurality of printer queues 120F are provided in the terminal storage unit 120 of the terminal device 1. Note that the case where the plurality of printer queues 120F are provided may be, for example, a case where a plurality of printers 2 are connected to the terminal device 1 and the printer queues 120F are registered on a printer 2 basis, a case where a plurality of printing schemes of monochrome printing, color printing, or the like are provided and the printer queues 120F are registered on a printing scheme basis, or the like.

When determining whether or not the aggregation condition is met, the determination unit 1131 monitors the divided job data BD received by the printer driver execution unit 1120 from the application execution unit 1110. The divided job data BD includes identification information that identifies the printer queue 120F which stores the divided job execution data BJD generated by the printer driver execution unit 1120. When identification information about the printer queue 120F included in the divided job data BD being monitored differs from identification information included in the divided job data BD previously received by the printer driver execution unit 1120, the determination unit 1131 determines that the aggregation condition is met. The aggregation unit 1132 then aggregates a plurality of divided job execution data BJD stored in the printer queue 120F before the change and generates the aggregated divided job execution data KBJD when the determination unit 1131 determines that the aggregation condition is met.

Determination of this aggregation condition enables the aggregation unit 1132 to automatically and accurately transmit the plurality of divided job execution data BJD for execution of a single print job IJ to the printer 2 as a single set of data. Therefore, even when the printer driver execution unit 1120 stores the divided job execution data BJD in an incorrect printer queue 120F, the terminal device 1 may automatically and accurately prevent a print material that the user does not intend to print from being mixed with a print material to be printed by the printer 2.

The determination unit 1131 may be configured to perform the determination as to whether or not the aggregation condition is met in accordance with a change in identification information of the printer queue 120F, parallel to the determination as to whether or not the aggregation condition is met in accordance with the elapsed time. In such a case, if the determination unit 1131 determines that any one of the aggregation conditions is met, the aggregation unit 1132 generates aggregated divided job execution data KBJD. According to such a configuration, the aggregation unit 1132 can automatically and accurately transmit the plurality of divided job execution data BJD for execution of a single print job IJ to the printer 2 as a single set of data even when the user provides print execution instruction designating one printer queue 120F to a terminal device 1 and then provides print execution instruction designating another printer queue 120F to the same terminal device 1 within a short period. Therefore, the terminal device 1 may automatically and accurately prevent a print material that the user does not intend to print from being mixed with a print material to be printed by the printer 2.

Next, the operation in the aggregation unit 1132 when the user designates collate printing in a print execution instruction will be described. Collate printing is a printing scheme to print a plurality of print materials sequentially on a sorted set basis.

Figure 4:
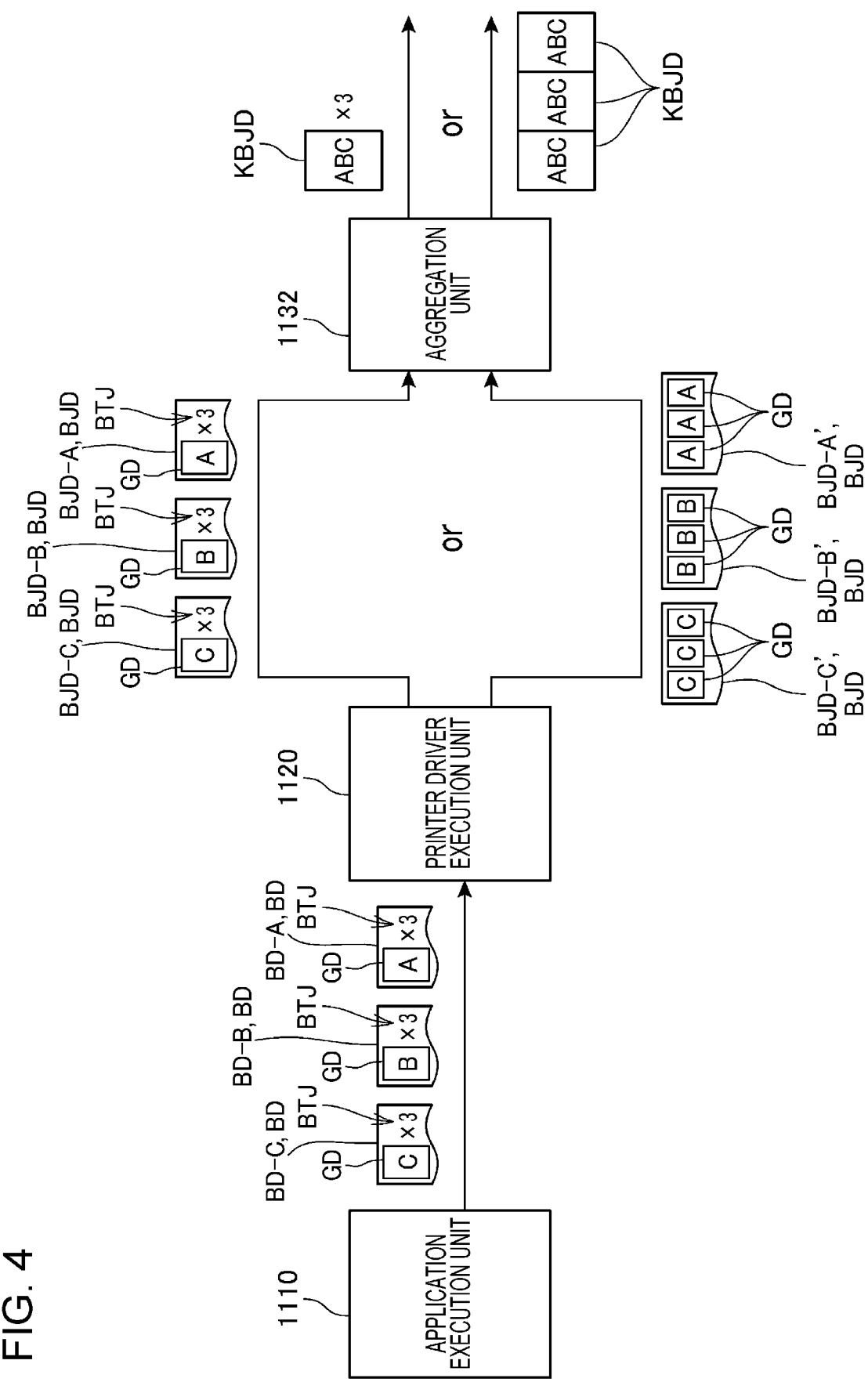
FIG. 4 is a diagram illustrating an operation in an aggregation unit in collate printing.

FIG. 4 is a diagram illustrating the operation in the aggregation unit 1132 in collate printing. FIG. 4 illustrates a case as an example where collate printing is performed on three sets of print materials in accordance with a single print job IJ. Further, in the illustration of FIG. 4, each set of print materials consists of a page in which an image "A" is printed, a page in which an image "B" is printed, and a page in which an image "C" is printed. Further, FIG. 4 illustrates a case as an example where the application execution unit 1110 transmits three divided job data BD for a single print job IJ to the printer driver execution unit 1120. Note that FIG. 4 is a diagram illustrating the operation in the aggregation unit 1132 in collate printing. Thus, features in FIG. 4 that the number of sets in collate printing is three, that one set of print materials consists of three pages, and that the divided jobs BJ are divided on a particular page basis are mere examples.

It is assumed that the user operates the terminal device 1 and provides a print execution instruction to perform collate printing on three print materials. As illustrated in FIG. 4, the application execution unit 1110 then generates divided job data BD-A including at least image data GD representing an image of "A", set quantity information BTJ indicating three sets, and identification information on a single print job IJ and transmits the divided job data BD-A to the printer driver execution unit 1120. Further, the application execution unit 1110 then generates divided job data BD-B including at least image data GD representing an image of "B", set quantity information BTJ indicating three sets, and identification information on a single print job IJ and transmits the divided job data BD-B to the printer driver execution unit 1120. Further, the application execution unit 1110 then generates divided job data BD-C including at least image data GD representing an image of "C", set quantity information BTJ indicating three sets, and identification information on a single print job IJ and transmits the divided job data BD-C to the printer driver execution unit 1120.

In response to receiving the divided job data BD including the set quantity information BTJ, the printer driver execution unit 1120 generates divided job execution data BJD in any one of two data forms. The divided job execution data BJD will be described below for respective data forms.

First, a case where the printer driver execution unit 1120 generates the divided job execution data BJD in the first data form will be described.

In response to receiving divided job data BD from the application execution unit 1110, the printer driver execution unit 1120 generates divided job execution data BJD-A including at least image data GD representing an image of "A", set quantity information BTJ indicating three sets, a print command, and identification information on a single print job J. The printer driver execution unit 1120 then stores the generated divided job execution data BJD-A in the printer queue 120F. Next, in response to receiving the divided job data BD from the application execution unit 1110, the printer driver execution unit 1120 generates divided job execution data BJD-B including at least image data GD representing an image of "B", set quantity information BTJ indicating three sets, a print command, and identification information on the single print job J. The printer driver execution unit 1120 then stores the generated divided job execution data BJD-B in the printer queue 120F. Next, in response to receiving the divided job data BD from the application execution unit 1110, the printer driver execution unit 1120 generates divided job execution data BJD-C including at least image data GD representing an image of "C", set quantity information BTJ indicating three sets, a print command, and identification information on the single print job J. The printer driver execution unit 1120 then stores the generated divided job execution data BJD-C in the printer queue 120F.

When the determination unit 1131 determines that the predetermined aggregation condition described above is met, the aggregation unit 1132 of the monitoring unit 1130 determines whether or not the set quantity information BTJ indicating the same number of sets is included for each of the divided job execution data BJD-A, BJD-B, and BJD-C stored in the printer queue 120F. If the aggregation unit 1132 determines that the set quantity information BTJ indicating the same number of sets is included for each of the divided job execution data BJD-A, BJD-B, and BJD-C stored in the printer queue 120F, the aggregation unit 1132 determines the number of sets indicated by the set quantity information BTJ as the number of sets of print materials.

The aggregation unit 1132 transmits the aggregated divided job execution data KBJD to the printer 2 in any one of two forms.

First, the aggregation unit 1132 when transmission is performed in the first form will be described. The aggregation unit 1132 removes the set quantity information BTJ from each of the divided job execution data BJD-A, BJD-B, and BJD-C, aggregates the divided job execution data BJD-A, BJD-B, and BJD-C from which the set quantity information BTJ has been removed, and generates the aggregated divided job execution data KBJD used for causing the printer 2 to perform printing of one set of print materials. That is, as illustrated in FIG. 4, the aggregation unit 1132 generates the aggregated divided job execution data KBJD used for causing the printer 2 to print one set of print materials consisting of three pages in which the images of A, B, and C are printed, respectively. The aggregation unit 1132 then transmits the generated aggregated divided job execution data KBJD to the printer 2 in association with the set quantity information BTJ indicating three sets.

Next, the aggregation unit 1132 when transmission is performed in the second form will be described. The aggregation unit 1132 duplicates data for the determined number of sets for each of the divided job execution data BJD-A, BJD-B, and BJD-C. At this time, the aggregation unit 1132 deletes the set quantity information BTJ from all the divided job execution data BJD including duplicated data. The aggregation unit 1132 then rearranges the divided job execution data BJD and generates three aggregated divided job execution data KBJD used for performing printing of one set of print materials. That is, as illustrated in FIG. 4, the aggregation unit 1132 generates three aggregated divided job execution data KBJD each used for causing the printer 2 to print one set of print materials consisting of three pages in which the images of A, B, and C are printed, respectively. The aggregation unit 1132 then causes the terminal communication unit 11 to transmit the generated three aggregated divided job execution data KBJD in an aggregated state to the printer 2.

Next, a case where the printer driver execution unit 1120 generates the divided job execution data BJD in the second data form will be described.

In response to receiving the divided job data BD-A from the application execution unit 1110, the printer driver execution unit 1120 generates divided job execution data BJD-A' including three image data GD each representing an image of "A". The printer driver execution unit 1120 then stores the generated divided job execution data BJD-A' in the printer queue 120F. Next, in response to receiving the divided job data BD-B from the application execution unit 1110, the printer driver execution unit 1120 generates the divided job execution data BJD-B' including three image data GD each representing an image of "B". The printer driver execution unit 1120 then stores the generated divided job execution data BJD-B' in the printer queue 120F. Next, in response to receiving the divided job data BD-C from the application execution unit 1110, the printer driver execution unit 1120 generates divided job execution data BJD-C' each including three image data GD representing an image of "C". The printer driver execution unit 1120 then stores the generated divided job execution data BJD-C' in the printer queue 120F. In such a way, the divided job execution data BJD includes no set quantity information BTJ in the second data form.

When the determination unit 1131 determines that the predetermined aggregation condition described above is met, the aggregation unit 1132 of the monitoring unit 1130 identifies how many pieces of the same image data GD are included for each of the divided job execution data BJD-A', BJD-B', and BJD-C' stored in the printer queue 120F. The aggregation unit 1132 determines whether or not the identified number is the same for the divided job execution data BJD-A', BJD-B', and BJD-C'. If it is determined to be the same, the aggregation unit 1132 determines the identified number of image data GD as the number of sets of print materials.

The aggregation unit 1132 transmits the aggregated divided job execution data KBJD to the printer 2 in any one of two forms.

First, the aggregation unit 1132 when transmission is performed in the first form will be described. The aggregation unit 1132 divides each of the divided job execution data BJD-A', BJD-B', and BJD-C' into divided job execution data BJD on image data GD basis. The aggregation unit 1132 then rearranges the divided pieces of divided job execution data BJD and generates aggregated divided job execution data KBJD used for printing one set of print materials. That is, as illustrated in FIG. 4, the aggregation unit 1132 performs rearrangement and generates the aggregated divided job execution data KBJD used for causing the printer 2 to print one set of print materials consisting of three pages in which the images of A, B, and C are printed, respectively. The aggregation unit 1132 then transmits the generated aggregated divided job execution data KBJD to the printer 2 in association with the set quantity information BTJ indicating three sets corresponding to the determined number of sets.

Next, the aggregation unit 1132 when transmission is performed in the second form will be described. The aggregation unit 1132 divides each of the divided job execution data BJD-A', BJD-B', and BJD-C' into divided job execution data BJD on image data GD basis. The aggregation unit 1132 rearranges the divided pieces of the divided job execution data BJD and generates three aggregated divided job execution data KBJD each used for printing one set of print materials. That is, as illustrated in FIG. 4, the aggregation unit 1132 generates three aggregated divided job execution data KBJD each used for causing the printer 2 to print one set of print materials consisting of three pages in which the images A, B, and C are printed, respectively. The aggregation unit 1132 then causes the terminal communication unit 11 to transmit the generated three aggregated divided job execution data KBJD in an aggregated state to the printer 2.

In such a way, the aggregation unit 1132 determines the number of sets of print materials to be printed in the single print job IJ in accordance with the divided job execution data BJD to be aggregated. The aggregation unit 1132 then generates aggregated divided job execution data KBJD used for performing printing of one set of print materials. The aggregation unit 1132 transmits, to the printer 2, the aggregated divided job execution data KBJD generated in accordance with the determined number of sets. Accordingly, the aggregation unit 1132 can transmit, to the printer 2, data aggregated so that collate printing is suitably performed. Therefore, the terminal device 1 may automatically prevent a print material that the user does not intend to print from being mixed with a print material to be printed by the printer 2 and may cause the printer 2 to suitably perform collate printing.

Note that, although in the collate printing described with reference to FIG. 4, the application execution unit 1110 transmits the divided job data BD including the set quantity information BTJ to the printer driver execution unit 1120, the divided job data BD may include no set quantity information BTJ. For example, when three sets of print materials illustrated in FIG. 4 are collate-printed, the application execution unit 1110 may transmit nine divided job data BD to the printer driver execution unit 1120 on a page basis. In such a case, the printer driver execution unit 1120 generates nine divided job execution data BJD in accordance with the nine divided job data BD. The aggregation unit 1132 then rearranges the divided job execution data BJD and generates three aggregated divided job execution data KBJD used for causing the printer 2 to print one set of print materials consisting of three pages in which the images A, B, and C are printed, respectively. In such a way, even when the application execution unit 1110 transmits the divided job data BD without the set quantity information BTJ to the printer driver execution unit 1120, since the aggregation unit 1131 suitably performs rearrangement and generates the aggregated divided job execution data KBJD, the same advantageous effects as described above are obtained.

As described above, the terminal device 1 includes the printer driver execution unit 1120 that generates divided job execution data BJD used for causing the printer 2 to perform printing, the terminal storage unit 120 that stores the divided job execution data BJD generated by the printer driver execution unit 1120, the determination unit 1131 that determines whether or not a predetermined aggregation condition is met, the aggregation unit 1132 that generates aggregated divided job execution data KBJD in which a plurality of divided job execution data stored in the terminal storage unit 120 are aggregated when the determination unit 1131 determines that the predetermined aggregation condition is met, and the terminal communication unit 11 that transmits the aggregated divided job execution data KBJD generated by the aggregation unit 1132 to the printer 2.

In the control method of the terminal device 1, the terminal device 1 generates divided job execution data BJD used for causing the printer 2 to perform printing, stores the generated divided job execution data BJD, determines whether or not a predetermined aggregation condition is met, generates aggregated divided job execution data KBJD in which a plurality of stored divided job execution data are aggregated when it is determined that the predetermined aggregation condition is met, and transmits the generated aggregated divided job execution data KBJD to the printer 2. Note that the control method of the terminal device 1 corresponds to an example of a control method of a control device.

The monitoring program 120D causes the terminal control unit 10 to determine whether or not the predetermined aggregation condition is met, generate the aggregated divided job execution data KBJD in which a plurality of divided job execution data BJD stored in the terminal storage unit 120 when it is determined that the predetermined aggregation condition is met, and cause the terminal communication unit 11 to transmit the generated aggregated divided job execution data KBJD to the printer 2.

According to the terminal device 1, the control method of the terminal device 1, and the monitoring program 120D, since a plurality of divided job execution data BJD can be automatically transmitted to the printer 2 as a single set of data, it is possible to automatically prevent a print material based on a print data ID transmitted from another terminal device 1 from being mixed with a print material to be printed by the printer 2 even when the printer 2 receives a print data ID from another terminal device 1. Therefore, the terminal device 1, the control method of the terminal device 1, and the monitoring program 120D may automatically prevent another print material from being mixed with a print material to be printed by the printer 2.

The printer driver execution unit 1120 generates the divided job execution data BJD for each of the plurality of divided jobs BJ divided from a single print job IJ.

According to such a configuration, it is possible to automatically transmit a plurality of divided job execution data BJD used for performing a single print job IJ to the printer 2 as a single set of data. Thus, even when the printer 2 receives a print data ID from another terminal device 1, one terminal device 1 can prevent a print material based on a print data ID transmitted from the other terminal device 1 from being mixed with a print material to be printed by the printer 2 in accordance with execution of a single print job IJ. Therefore, the terminal device 1 may automatically prevent a print material that the user does not intend to print from being mixed with a print material to be printed by the printer 2.

The determination unit 1131 determines that the predetermined aggregation condition is met when new divided job execution data BJD is not stored within a certain period from the last time when the terminal storage unit 120 stored the divided job execution data BJD.

According to such a configuration, the aggregation unit 1132 can automatically and accurately transmit the plurality of divided job execution data BJD used for executing each single print job IJ to the printer 2 as a single set of data. Therefore, the terminal device 1 may automatically and accurately prevent a print material that the user does not intend to print from being mixed with a print material to be printed by the printer 2.

The determination unit 1131 acquires the processing capacity information 120E indicating the processing capacity of the terminal device 1, determines the certain period in accordance with the processing capacity indicated by the acquired processing capacity information 120E, and determines whether or not a predetermined condition is met in accordance with the determined certain period.

According to such a configuration, by determining the certain period in accordance with the processing capacity of the terminal device 1, it is possible to reduce waiting time for printing and prevent a print material that the user does not intend to print from being mixed with a print material to be printed by the printer 2.

The divided job data BD includes identification information that identifies a single print job IJ. The determination unit 1131 determines that the predetermined aggregation condition is met when the divided job data BD to be generated by the printer driver execution unit 1120 differs from another generated divided job data BD.

According to such a configuration, the aggregation unit 1132 can automatically and accurately transmit a plurality of divided job execution data BJD used for performing a single print job IJ to the printer 2 as a single set of data. Therefore, the terminal device 1 may automatically and accurately prevent a print material that the user does not intend to print from being mixed with a print material to be printed by the printer 2.

The terminal device 1 includes a plurality of printer queues 120F. The determination unit 1131 determines that the predetermined aggregation condition is met when the printer queue 120F of the divided job execution data BJD generated by the printer driver execution unit 1120 differs from the printer queue 120F of another divided job execution data BJD stored in the terminal storage unit 120.

According to such a configuration, the aggregation unit 1132 can automatically and accurately transmit a plurality of divided job execution data BJD used for performing a single print job IJ to the printer 2 as a single set of data. Therefore, the terminal device 1 may automatically and accurately prevent a print material that the user does not intend to print from being mixed with a print material to be printed by the printer 2.

The aggregation unit 1132 determines the number of sets of a print material printed by a single print job IJ in accordance with the divided job execution data BJD to be aggregated, generates the aggregated divided job execution data KBJD used for performing printing of a set of the print material, and causes the terminal communication unit 11 to transmit the generated aggregated divided job execution data KBJD to the printer 2.

According to such a configuration, the aggregation unit 1132 can transmit, to the printer 2, data aggregated so that collate printing is suitably performed. Therefore, the terminal device 1 can automatically prevent a print material that the user does not intend to print from being mixed with a print material to be printed by the printer 2 and enable the printer 2 to suitably perform collate printing.

Each of the embodiments described above is intended to merely illustrate an aspect of the present invention, and any modification and application thereof are possible within the scope of the present invention.

For example, although the printing scheme of the printer 2 in accordance with the present embodiment is the thermal scheme, the printing scheme of the printer 2 is not limited to the thermal scheme but may be other printing schemes such as an ink jet scheme. Further, the type of the print head of the printer 2 is not limited to a line type but may be a serial type.

Further, while configured to store the processing capacity information 120E in the terminal storage unit 120, the terminal device 1 of the present embodiment may be configured to acquire the processing capacity information 120E from a predetermined server.

Further, the function of the terminal control unit 10 and the printer control unit 20 may be implemented by a plurality of processors or a semiconductor chip.

Further, each component illustrated in FIG. 1 is an example, and the specific implementation is not particularly limited. That is, hardware individually corresponding to each component is not necessarily required to be implemented, and the function of each component may be implemented by a single processor executing a program. Further, a part of the function implemented with software in the embodiments described above may be implemented with hardware, or a part of the function implemented with hardware in the embodiments described above may be implemented with software. In addition, the specific detailed configuration of each of other components of the terminal device 1 and the printer 2 may be changed in any form within the scope not departing from the spirit of the present invention.

Further, for example, an individual step of the operation illustrated in FIG. 3 is a result of division in accordance with the main feature of the operation for easier understanding of the operation of the terminal device 1, and the present disclosure is not limited by the form of division or the name of an individual operation. The operation may be divided into more individual steps in accordance with the feature of an operation. Further, the operation may be divided so that a single individual step includes more operations. Further, the order of these steps may be exchanged as appropriate as far as the spirit of the present disclosure is not affected.

What is claimed is:

1. A control device comprising:
a generation unit that generates at least one execution data piece causing a printer device to perform printing;
a storage unit that stores the at least one execution data piece generated by the generation unit;
a determination unit that determines whether or not a predetermined aggregation condition is met;
an aggregation unit that, when the determination unit determines that the predetermined aggregation condition is met, generates aggregated execution data in which a plurality of execution data pieces stored in the storage unit are aggregated; and
a transmission unit that transmits the aggregated execution data generated by the aggregation unit to the printer device, wherein
the generation unit generates, in accordance with divided job data related to corresponding one of divided jobs divided from a single print job, execution data that causes the printer device to execute the divided job, and
when, after the storage unit stores an execution data piece, the storage unit does not store another execution data piece for a certain period, the determination unit determines that the predetermined aggregation condition is met.

2. The control device according to claim 1, wherein the determination unit acquires processing capacity information indicating a processing capacity of the control device, determines the certain period in accordance with the processing capacity indicated by the acquired processing capacity information, and determines in accordance with the determined certain period whether or not the predetermined aggregation condition is met.

3. The control device according to claim 1, wherein
the divided job data includes identification information that identifies the single print job, and
when identification information included in divided job data received by the generation unit differs from identification information included in divided job data that is generated, the determination unit determines that the predetermined aggregation condition is met.

4. The control device according to claim 1 further comprising a plurality of printer queues, wherein
when one of the printer queues of execution data generated by the generation unit differs from one of the printer queues of execution data stored in the storage unit, the determination unit determines that the predetermined aggregation condition is met.

5. The control device according to claim 1, wherein
the aggregation unit
determines the number of sets of print materials to be printed by a single print job in accordance with execution data to be aggregated, and
generates aggregated execution data that causes the printer device to perform printing of one of the sets of print materials, and
the transmission unit transmits the generated aggregated execution data to the printer device in accordance with the determined number of sets of print materials.

6. A control method of a control device, the control method comprising:
generating at least one execution data piece that causes a printer device to perform printing;
storing the at least one generated execution data piece in a storage unit;
determining whether or not a predetermined aggregation condition is met;
when it is determined that the predetermined aggregation condition is met, generating aggregated execution data in which a plurality of stored execution data pieces are aggregated; and
transmitting the generated aggregated execution data to the printer device, wherein
generating the at least one execution data piece comprises generating, in accordance with divided job data related to corresponding one of divided jobs divided from a single print job, execution data that causes the printer device to execute the divided job, and when, after the at least one execution data piece is stored in the storage unit, not storing another execution data piece for a certain period and determining whether or not a predetermined aggregation condition is met.

7. A non-transitory computer-readable storage medium storing a program executed by a control unit of a control device including a generation unit that generates at least one execution data piece causing a printer device to perform printing, a storage unit that stores the at least one execution data piece generated by the generation unit, a communication unit that communicates with the printer device, the program causing the control unit to execute a process comprising:
generating the at least one execution data piece comprises generating, in accordance with divided job data related to corresponding one of divided jobs divided from a single print job, execution data that causes the printer device to execute the divided job;
determining whether or not a predetermined aggregation condition is met when, after the at least one execution data piece is stored in the storage unit, another execution data piece is not stored in the storage unit for a certain period;
when it is determined that the predetermined aggregation condition is met, generating aggregated execution data in which a plurality of execution data pieces stored in the storage unit are aggregated; and
causing the communication unit to transmit the generated aggregated execution data to the printer device.

* * * * *